United States Patent [19]

Edwards

[11] Patent Number: 5,194,862
[45] Date of Patent: Mar. 16, 1993

[54] TOUCH SENSOR ARRAY SYSTEMS AND DISPLAY SYSTEMS INCORPORATING SUCH

[75] Inventor: Martin J. Edwards, Crawley, United Kingdom

[73] Assignee: U.S. Philips Corporation, New York, N.Y.

[21] Appl. No.: 713,237

[22] Filed: Jun. 7, 1991

[30] Foreign Application Priority Data

Jun. 29, 1990 [GB] United Kingdom ............... 9014529

[51] Int. Cl.⁵ .................. H03M 11/00; G09G 3/00
[52] U.S. Cl. ........................... 341/20; 341/33; 341/34; 340/712
[58] Field of Search ............... 341/20, 26, 33, 34, 341/22; 178/18, 19; 357/4; 340/712, 825.88, 711, 706; 307/125

[56] References Cited

U.S. PATENT DOCUMENTS

| | | | |
|---|---|---|---|
| 4,145,748 | 3/1979 | Eichelberger et al. | 341/33 |
| 4,520,357 | 5/1985 | Castleberry et al. | 178/18 |
| 4,655,552 | 4/1987 | Togashi et al. | 357/4 |
| 4,686,332 | 8/1987 | Greanias et al. | 340/706 |
| 4,839,634 | 6/1989 | More et al. | 178/18 |

Primary Examiner—Donald J. Yusko
Assistant Examiner—R. Gray
Attorney, Agent, or Firm—Brian J. Wieghaus

[57] ABSTRACT

A touch sensor array system includes a row and column array of individual sensing elements each of which has a bistable circuit arranged to adopt one of the other of its two stable state in dependence upon whether or not a touch input, by e.g. a stylus or finger, exists at the sensing element location. The rows of sensing elements are periodically reset in sequence by a scanning address circuit and the states of their bistable circuits are determined at regular intervals related to resetting by a detection circuit using active matrix addressing of the sensing elements. Each sensing element includes a switching device. The array of sensing elements is fabricated using thin film, e.g. TFT, technology so that high resolution is possible. The system can be used as an overlay to a display device, e.g. a matrix liquid crystal display device.

20 Claims, 5 Drawing Sheets

TOUCH SENSOR ARRAY SYSTEMS AND DISPLAY SYSTEMS INCORPORATING SUCH

BACKGROUND OF THE INVENTION

This invention relates to a touch sensor array system including an array of sensing elements arranged according to rows and columns and provided with addressing means on the basis of row and column conductors for selectively addressing a particular one of said sensing means at an intersection of a selected row conductor and a selected column conductor.

Such a system may be used as an overlay for the display screen of an liquid crystal or other display device to provide for example selected inputs to the device in accordance with touched positions in the sensor array. In another example, the system may be used as a stand-alone graphics tablet connected to a computer system.

Various kinds of touch sensor array systems are known.

In a particular kind of touch sensor array system, capacitive effects are utilised. In an example, pairs of spaced conductive strips or pads are provided which can either be physically displaced with respect to one another in response to finger pressure so as to alter the capacitance therebetween or capacitively coupled together in response to proximity of a user's finger.

Such systems typically have only limited resolution capabilities.

Inter alia, it is an object of the present invention to provide an improved touch sensor array system, which offers the capability of high resolution.

SUMMARY OF THE INVENTION

According to one aspect of the present invention, each sensing element comprises a bistable circuit at the sensing element's location in the array, which bistable circuit is responsive to a presence or absence of a touch input at the location of the sensing element so as to adopt a first or a second stable state respectively that remains continuously addressable, and which upon addressing by addressing means provides an output in accordance with its actual state, said system having reset means for periodically resetting the bistable circuits of the sensing elements.

Touching of the sensing elements for example may be by means of a user's finger or by means of a stylus. Upon touching by such position designating objects the bistable circuit is caused to adopt a certain stable state which is different to the stable state adopted by the circuit in the absence of a touch input so that a clear, unambiguous indication of touching is obtained. Following the adoption of one or the other state, the bistable circuit remains in that state until it is next called upon to sense touching and therefore acts in the manner of a memory element whose state is determined by touching, and which, by interrogation, can provide an indication of touching after the event, enabling the touched locations in the array to be ascertained. The addressing means, by periodically resetting the bistable circuits, and preferably at regular intervals, enables a series of successive touches, or absence of touches, to be detected.

Preferably, the sensing elements each include a respective switching device in a matrix of switching devices and are actively addressable through operation of the switching devices by the addressing means to connect the bistable circuits to a state detection circuit of the addressing means. Such active addressing of the sensing elements enables large numbers of sensing elements to be used in the array thereby providing a high element density or high resolution and without the kind of problems which could be expected when using a simple multiplexing technique for monitoring the sensing element states. The active addressing of the sensing elements, and hence the monitoring of their states, desirably is carried out at intervals related to the periodic resetting of the bistable circuits by the addressing means.

In a preferred embodiment the active matrix switching devices comprise transistors. Although other forms of switching devices such as two-terminal non-linear devices, e.g. diodes or MIMs, could be used it is felt that transistors provide the simpler approach for actively addressing the sensing elements.

Preferably, the bistable circuit of each sensing element is responsive to a capacitive effect produced by position designating means, e.g. a finger or stylus, in proximity to the sensing element. Each sensing element may include a sensing electrode which, in conjunction with the touch designating means adjacent thereto, provides a certain, characteristic, capacitance. The bistable circuit responds to the existence of this capacitance to adopt its first state. This can be achieved conveniently in practice using a bistable circuit comprising two cross-coupled inverters with the sensing electrode being connected to a respective one of the bistable nodes and a reference capacitance being connected to the other bistable node. If the two capacitances are not the same then an imbalance in voltages present at the nodes will exist and following resetting of the bistable circuit to a metastable state the bistable circuit adopts a state depending on which of the capacitances is greater. A layer of insulating material may conveniently be provided over the sensing electrodes of the sensing elements. The electrode and the position designating means either on, or in close proximity to, the exposed surface of the insulating layer constitute respective capacitor plates with the insulating layer serving as the capacitor dielectric. The physical dimensions of the electrode and overlying insulating layer are selected such that the value of the capacitance obtained upon the position designating means being presented in relation to the value of the reference capacitance causes the bistable circuit to switch appropriately. With this sensing electrode arrangement no direct external connection to the sensing electrode is required. The insulating layer can conveniently be of hard wearing material so that even with extensive use of a stylus damage does not occur to the sensing elements. The insulating layers of the sensing elements can comprise respective portions of a common layer extending continuously over the array of sensing elements. Consequently a continuous and protective sensing surface is provided.

Each bistable circuit comprising cross-coupled inverters may further include a switching transistor connected across the inputs of the two inverters and which is operable by the addressing means to set the bistable circuit in its metastable state.

Other types of bistable circuits could be used if desired. Also, it is considered that the sensing elements can be responsive to a touch input other than by using a capacitive approach. However, the latter is advantageous in that it avoids the need for direct electrical connections and allows the use of an insulating covering layer to provide a rugged sensing surface.

The bistable circuits of the sensing elements preferably comprise thin film transistors (TFTs). Similarly the active matrix transistors may also comprise TFTs. The processing of TFTs, particularly amorphous or polycrystalline silicon TFTs, on large area glass substrates is already well developed for active matrix liquid crystals display devices. Both the array of sensing elements and the active matrix switches can be fabricated using this technology. The sensor array shares many similarities with active matrix display devices, and fabrication of the sensor array by thin film deposition and patterning techniques used in active matrix switching technology is therefore particularly convenient. The additional components, such as addressing and monitoring conductors, capacitor elements, and insulated electrodes, are analogous to components often present in active matrix display devices, where picture elements comprise element electrodes, possibly with associated storage capacitors, connected via switching TFTs to row and column address conductors.

Using this technology, the sensor array can be fabricated with individual sensing elements of comparable size to picture elements in display devices. This has important implications in that high resolution is readily achievable.

According to another aspect of the present invention, there is provided a display system comprising a display device and a touch sensor array system according to the one aspect of the invention in which the sensing elements of the array are positioned over the display output of the display device. The display could, for example, be a liquid crystal display device comprising a matrix array of individually controllable pixels. The sensor system according to the invention offers an important advantage over known system when used with display devices, particularly of the aforementioned kind, in that a 1:1 pixel to sensing element relationship is obtainable especially, for example, when TFT active matrix technology is employed in the fabrication of the sensor array.

BRIEF DESCRIPTION OF THE DRAWINGS

Various embodiments of touch sensor array systems in accordance with the present invention will now be described, by way of example, with reference to the accompanying drawings, in which.

The Figures are merely schematic and are not drawn to scale. In particular, certain dimensions may have been exaggerated whilst others may have been reduced. The same reference numerals are used throughout to denote the same or similar parts.

DESCRIPTION OF THE PREFERRED EMBODIMENTS

Figure 1:
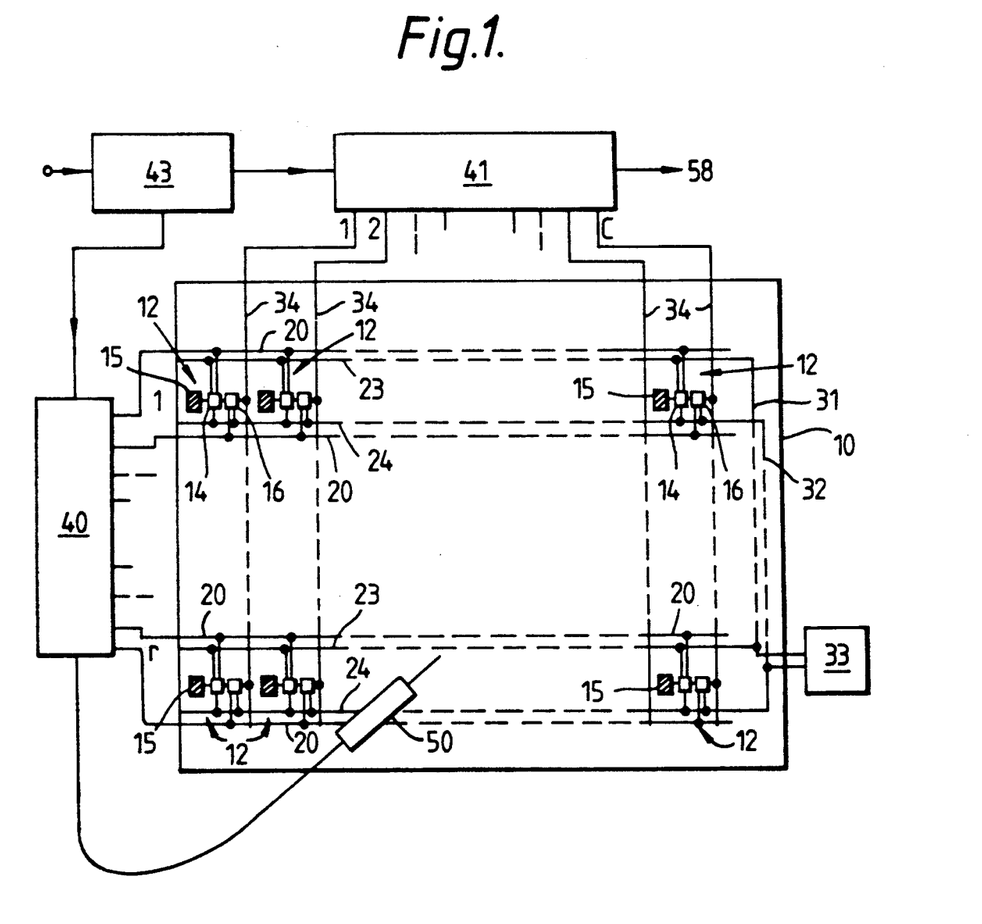
FIG. 1 is a simplified schematic diagram of one embodiment of touch sensor array system in accordance with the invention showing an array of individual sensing elements together with associated circuits.

Referring to FIG. 1, the touch sensor system includes an array of sensing elements carried on a common substrate to form a sensing panel 10.

Each sensing element, referenced at 12, comprises a bistable circuit 14 connected to an insulated sensing electrode 15 which constitutes one side of a capacitor, the other side being the touching object, either a grounded stylus or, or example, a finger of a user. The state of the bistable circuits is dependent on touching. If the sensing electrode of a particular sensing element is touched the associated bistable circuit adopts a certain indicative state. The sensing elements are combined in an active matrix comprising switching devices 16, each sensing element including a respective switching device, with row and column addressing conductors to allow the state of each row of sensing elements to be read and the positions that have been touched to be determined.

The sensing elements 12 are in an X-Y array consisting of r rows (1 to r) with c elements (1 to c) in each row. Only a few sensing elements are illustrated in FIG. 1 for simplicity. In practice there may be a several hundred columns and rows, the numbers chosen depending on the intended use. If used, for example, as a user interface for a computer graphics system, the number of sensing elements and the ratio of rows to columns would be dependent on the pixel count and aspect ratio of the system's display. If used as a display overlay, a 1:1 correspondence between pixels and sensing elements could be provided.

Figure 2:
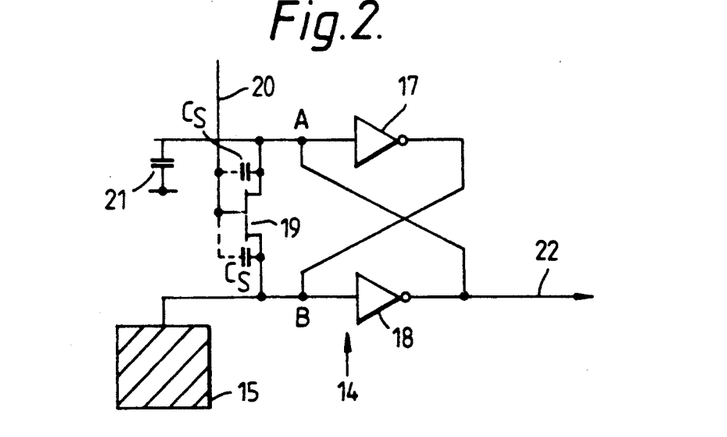
FIG. 2 shows schematically the equivalent circuit of a typical sensing element of the array.

The circuit configuration of part of a typical sensing element 12 is shown in FIG. 2. The element consists of a bistable circuit 14 comprising two cross-coupled inverters 17 and 18 and a switching transistor 19 connected between the two inverter inputs and whose control (gate) electrode is connected to a line 20 along which regular clocking, selection, signals are provided. One of the bistable nodes, referenced B, is connected to a sensing electrode 15, in the form of a rectangular pad of conductive material which is covered by an insulating layer, constituting the sensing element's input. The other node of the bistable circuit, referenced A, is connected to a reference capacitor 21 and also acts as the sensing element output, the output being provided along line 22.

Figure 3:
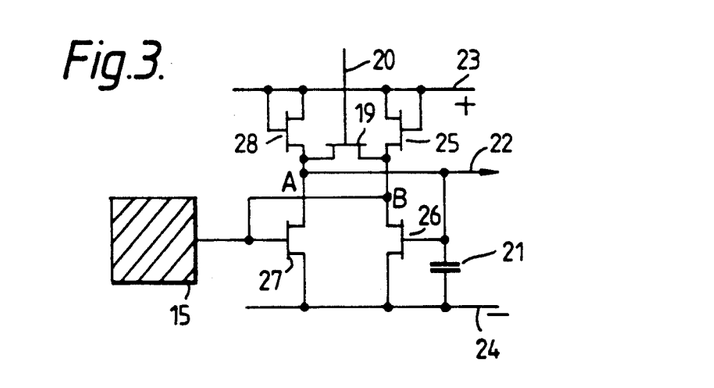
FIG. 3 illustrates a particular implementation of the sensing element.

An example implementation of this circuit configuration using NMOS transistors is illustrated in FIG. 3. Two transistors 25, 26 connected in series are arranged in parallel with two other series-connected transistors 27 and 28 between positive and negative rails 23 and 24 with the gates of transistors 25 and 28 also being connected to the rail 23. The sensing electrode 15 is connected to the gate of transistor 27 as well as node B whereas node A is connected to one side of the reference capacitor 21 which is also connected to the gate of transistor 26, the other side of the capacitor 21 being connected to the rail 24. The power supply rails 23 and 24 are shared by the bistable circuits of all other sensing elements in the same row, other rows of sensing elements being similarly associated with respective pairs of supply rails as shown in FIG. 1.

The bistable circuit 12 has two stable states, a first where A is high and B is low and a second where A is low and B is high, and a third state which is a metastable state where A and B are equal. When in this latter condition the bistable circuit is very sensitive to any imbalance introduced in the voltages at A and B and will readily revert to either the first or the second state depending on the sense of the imbalance.

Figure 4:
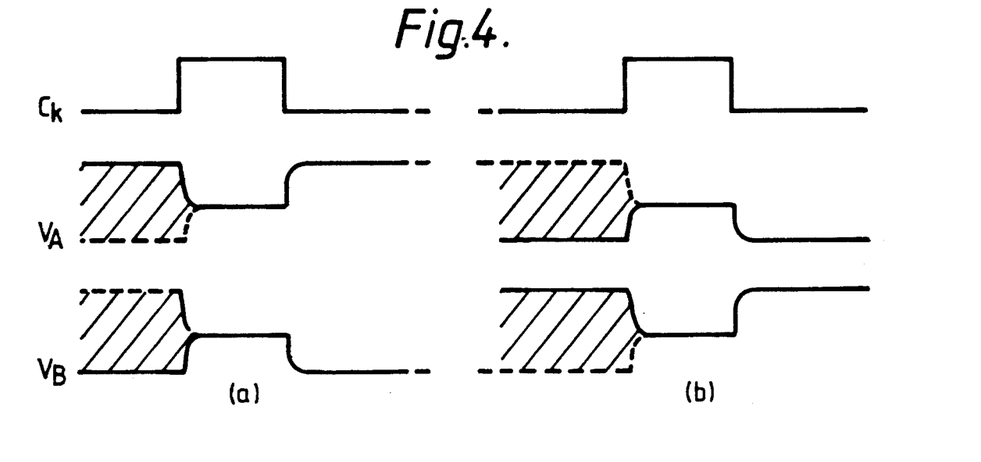
FIG. 4 illustrates typical waveforms in operation of the sensing elements.

In operation of the sensing element, the bistable circuit 12 is first set to its metastable state by taking the clock signal, Ck, on line 20 high to turn on the transistor 19. When turned on the transistor 19 connects nodes A and B and the voltages at these two nodes equalise at a voltage lying between the high and low logic levels. When the clocking signal Ck thereafter returns to a low level the negative going edge of the signal is coupled through onto nodes A and B by the parasitic gate-/source and gate/drain capacitances Cs of transistor 19. These capacitances Cs, which are substantially equal, are shown in dotted outline in FIG. 2. The capacitances Cs could instead be provided by two discrete capacitors. The magnitude of the voltage shift at nodes A and B caused by the presence of the respective capacitances Cs will depend on the value of the additional capacitance present at the associated node which for node A is the capacitance, Cr, of the reference capacitor 21 and for node B is the capacitance, Ce, of the input sensing electrode 15. If these capacitances are not the same then an imbalance in the circuit voltages is produced and since the nodes A and B are no longer interconnected by the transistor 19 the bistable circuit will flip into one or other of its two stable states depending on the relative values of the two capacitances. For example if the sensing electrode capacitance Ce is less than the reference capacitance Cr then the coupling of the signal Ck will cause the voltage at node A to be higher than that at node B and consequently the bistable circuit will flip into the state with A high and B low. Conversely, if the sensing electrode capacitance Ce is greater than the reference capacitance Cr the resulting voltage at node B will be greater than that at node A and the bistable circuit will switch to the opposite state in which node A is low and node B is high. The capacitance Ce of sensing electrode 15 can be of two distinct values according to whether or not a touch input is made to the sensing element, i.e. a higher capacitance is exhibited when a grounded finger or stylus is placed on, or closely adjacent, the surface of the dielectric layer covering the electrode 15. By selecting the value of Cr appropriately in relation to the capacitance at electrode 15 obtained by a touch input, which itself is dependent on the physical dimensions of the electrode 15 and the thickness of the insulating layer, the bistable circuit detects and responds to the increase in capacitance of the electrode 15 caused by touching the electrode with a finger or grounded stylus. Representative waveforms in operation of the sensing element are shown in FIG. 4, in which Ck is the clocking pulse signal waveform applied to the transistor 19, and $V_A$ and $V_B$ are, respectively, the voltages appearing at nodes A and B. FIG. 4a illustrates the case where Ce is less than Cr, i.e., for no touch input, and FIG. 4b illustrates the case where Ce is greater than Cr, i.e., for a touch input.

Figure 5:
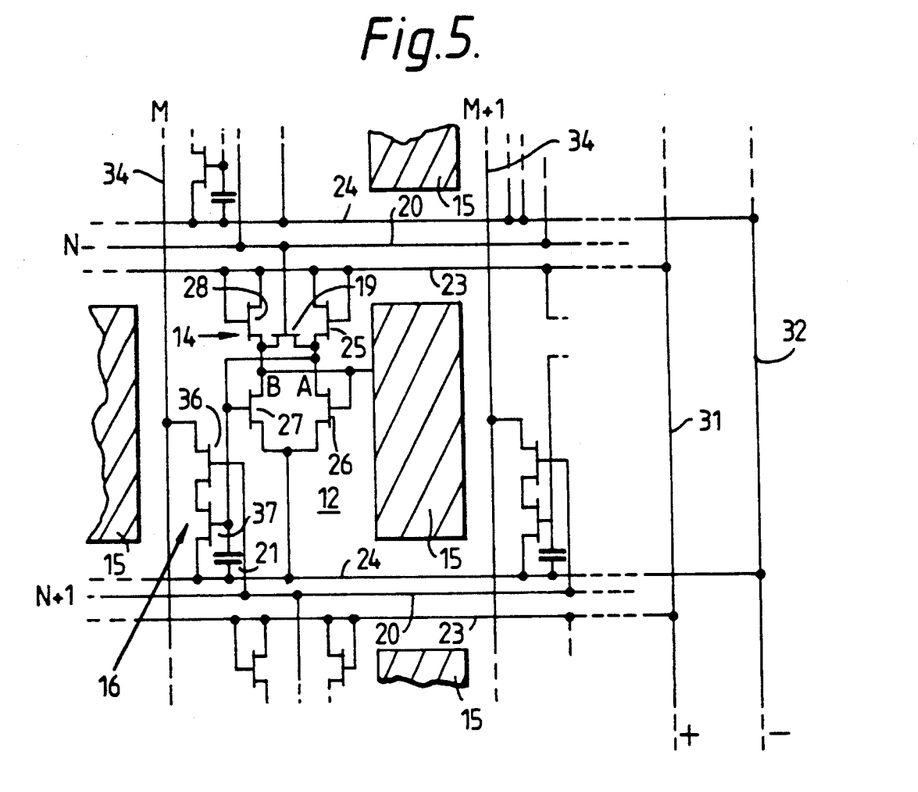
FIG. 5 illustrates the circuit of a part of the sensor array comprising one complete sensing element and associated active matrix switching device.

The array of sensing elements 12 of the sensing panel 10 are combined with the active matrix switching devices 16 together with driving and addressing conductors in the manner depicted, by way of illustration, in FIG. 5, which shows the circuit configuration of one complete, and representative, sensing element in the Nth row of Mth column of the array. The X-Y array of sensing elements 12 is driven and addressed via sets of row and column conductors with the sensing elements being located adjacent respective intersections of the column and row conductors. The clocking signals Ck for the transistor 19 (and the transistors 19 of other elements in the same row) are applied along a row conductor, 20, shared by all sensing elements 12 of the row. Similarly, the positive and negative (ground) supply lines 23 and 24 extend as row conductors and are shared by all other sensing elements in the same row. Referring also again to FIG. 1, the row conductors 23 and 24 are connected at their ends adjacent the periphery of the panel respectively to supply rails 31 and 32 to which the outputs of a power supply circuit 33 are coupled. Each column of sensing elements is associated with a respective one of a set of column, detection, conductors 34 to which the active matrix switching devices 16, comprising FET transistors, are connected. Referring to FIG. 5 particularly, the switching device 16 associated with each sensing element consists of two switching transistors 36 and 37 connected in series between the associated column conductor 34 and the supply conductor 24 with their gates connected respectively to the clock signal row conductor 20 associated immediately with the succeeding, (N+1)th, row of sensing elements and the node A of the bistable circuit of the sensing element.

The ends of the row conductors 20 and column conductors 34 are connected respectively to a row address circuit 40 which produces the clocking signals, and a column detection circuit 41 (FIG. 1) whose operations are controlled and synchronised by a timing and control circuit 43. The row addressing driver circuit 40 scans the conductors 20 sequentially with a clock pulse so that each complete row of sensing elements is reset and operated in turn, the clock pulses serving also to enable the states of the preceding row of sensing elements to be read out, and detected, via the column conductors 34, by the circuit 41 which provides an output at 58 indicative of the states of each row of sensing elements in turn. The first and last rows of the array differ slightly in that one of the two row conductors 20 associate with each of these rows is dedicated solely to that row (as shown in FIG. 1) so that there are r+1 conductors 20 in all. Scanning of the set of row conductors 20 by the circuit 40 is repeated in regular fashion in successive field periods.

In the version of the system shown in FIG. 1, a grounded stylus 50 is manipulated by a user to touch an appropriate sensing element, although it will be appreciated that the stylus can be replaced by a user's finger.

Figure 6:
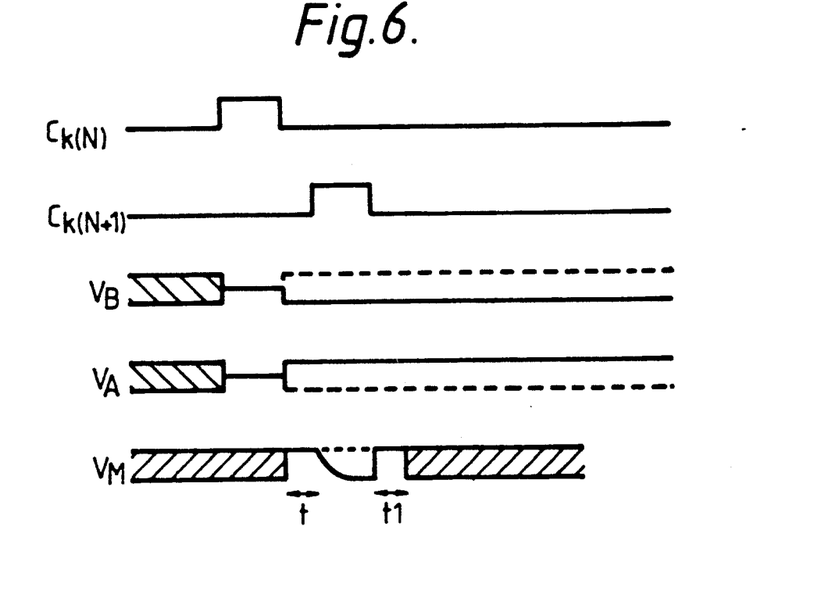
FIG. 6 illustrates typical waveforms present in the operation of the circuit part shown in FIG. 5.

FIG. 6 illustrates typical waveforms present in operation of the system of FIGS. 1 and 5 for a particular sensing element. Ck(N) and Ck(N+1) are the clocking pulse signals applied by the circuit 40 to the Nth and (N+1)th row conductors 20. Upon receipt of the clocking pulse Ck(N) the bistable circuit of the sensing element (and all other elements in the Nth row) is reset and then immediately thereafter switches to one or the other of its two possible stable states according to whether or not the sensing element is being touched. $V_A$ and $V_B$ represent, as before, voltage levels appearing at nodes A and B of the sensing element and in this particular example are indicative that the sensing element concerned is not being touched. The dotted lines signify the other possible state which would be adopted in the event of a touch input.

When a clock pulse, Ck, is applied to the next, (N+1)th, row conductor 20 to reset the bistable circuits of the (N+1)th row of sensing elements, the active matrix switching device 16 of the sensing element (and all others in the Nth row) is operated to enable the state of the sensing element to be determined. The bistable output of the sensing element is connected to the gate of transistor 37 which, because the output (node A) is low in this example, is turned off. The Ck (N+1) clocking pulse turns on transistor 36 but connection between the column conductor 34 and supply (ground) conductor 24 is prevented because transistor 37 is off. On the other hand, if the bistable circuit was in its other stable state, with node A high indicating touching, transistor 37 is turned on and the series-connected transistors 36 and 37 then provide an interconnection between column conductor 34 and ground conductor 24.

The state of the bistable circuit of the sensing element is ascertained by detecting in the detection circuit 41 connected to the column conductor whether or not such an interconnection exists. This can be achieved in different ways. For example, the column conductor 34 can be pre-charged to a high voltage level before the (N+1)th row conductor 20 is addressed and then, upon switching of the matrix transistor 36 by the Ck (N+1)th clocking signal, detecting whether or not this voltage is discharged through operation of the transistor 37, depending on the state of the bistable circuit. The voltage waveform for the Mth column conductor for this mode of operation is shown at Vm in FIG. 6, where t represents the precharging period and t1 the precharging period for the next row. Alternatively a current amplifier may be connected to the column conductor 34 to measure the current flow through the matrix transistors 36 and 37. The former technique allows logic level signals to be obtained directly from the column conductors of the matrix resulting in comparatively simple column drive circuitry. In this mode of operation the scanning rate of the rows of sensing elements may be limited as the active matrix transistors will require some time to discharge the capcitance of the column conductors. The latter technique requires a current or charge sensitive amplifier to be connected, in the detection circuit 41, to each column conductor 34 in order to convert the small signal from the active matrix transistors to the required logic levels.

Figure 7:
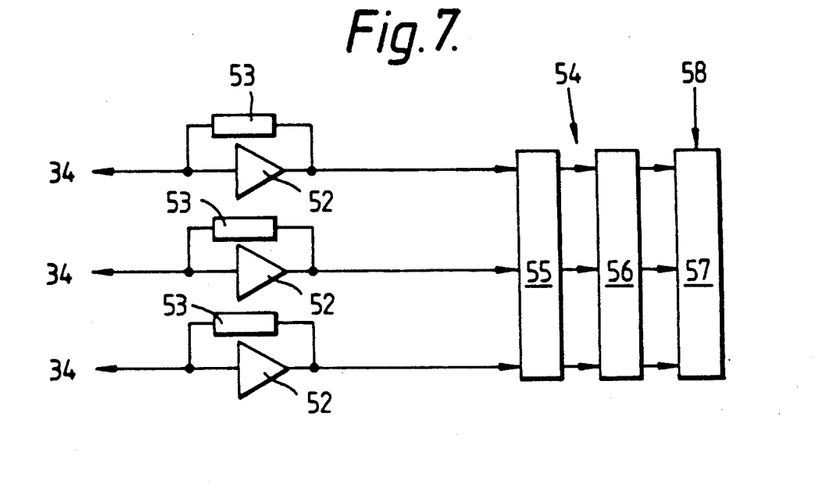
FIG. 7 shows schematically part of a detection circuit of the system.

By detecting the magnitude of the charging current with a respective sense amplifier connected to each column conductor, the system can determine which elements have been touched and their coordinates. FIG. 7 illustrates part of one detection circuit suitable for such detection, the part shown comprising for simplification the circuit arrangement for just three consecutive columns of sensing elements. Each column conductor 34 of the panel 10 is connected to an input of an inverting amplifier 52 having a parallel feedback impedance 53. The detectors are rendered either charge or current sensitive by providing either a capacitive or a resistive feedback impedance 53. The outputs of the amplifiers 52 are fed to a signal processing circuit 54 comprising a parallel threshold circuit 55 responsive to the effect of large current spikes in the column conductor waveform indicative of a sensing element associated with that column having been touched to provide appropriate digital signal outputs and a parallel latching circuit 56 connected to the outputs of the threshold circuit which latches the digital signals into a series of flip flops forming a shift register 57 to give a serial output 58.

By associating the output of the processing circuit 54 with operation of the row conductor driver circuit 40 unique signals identifying the coordinates of sensing elements which have been touched can be generated in ways known per se in touch sensor systems.

Each row of sensing elements is addressed by the addressing circuit 40 in turn, so that, after one complete field, an indication, or picture, of all sensing elements which have been touched and their position is obtained. Addressing of the array of sensing elements in this fashion is carried out in a recurrent cycle with the condition of each sensing element being repeatedly monitored in subsequent field periods. The duration of each field period may be varied as desired taking into account the number of rows of sensing elements in the array, the duration of the clocking pulses applied by the drive circuit 40, and the manner of operation of the detection circuit 41. Obviously the field period is chosen to be sufficiently small to ensure that relatively brief touch inputs are sensed. By way of example each field period may be approximately 20 msec., thus giving a very rapid response to user inputs and detection of rapidly changing touch inputs.

In the above described embodiment, a conducting stylus coupled to ground potential is used as a tool for entering input information. This enables small area sensing elements to be used and, in turn, allows a high resolution array to be achieved which is beneficial for use as an interface for a graphics display system for example.

Figure 8:
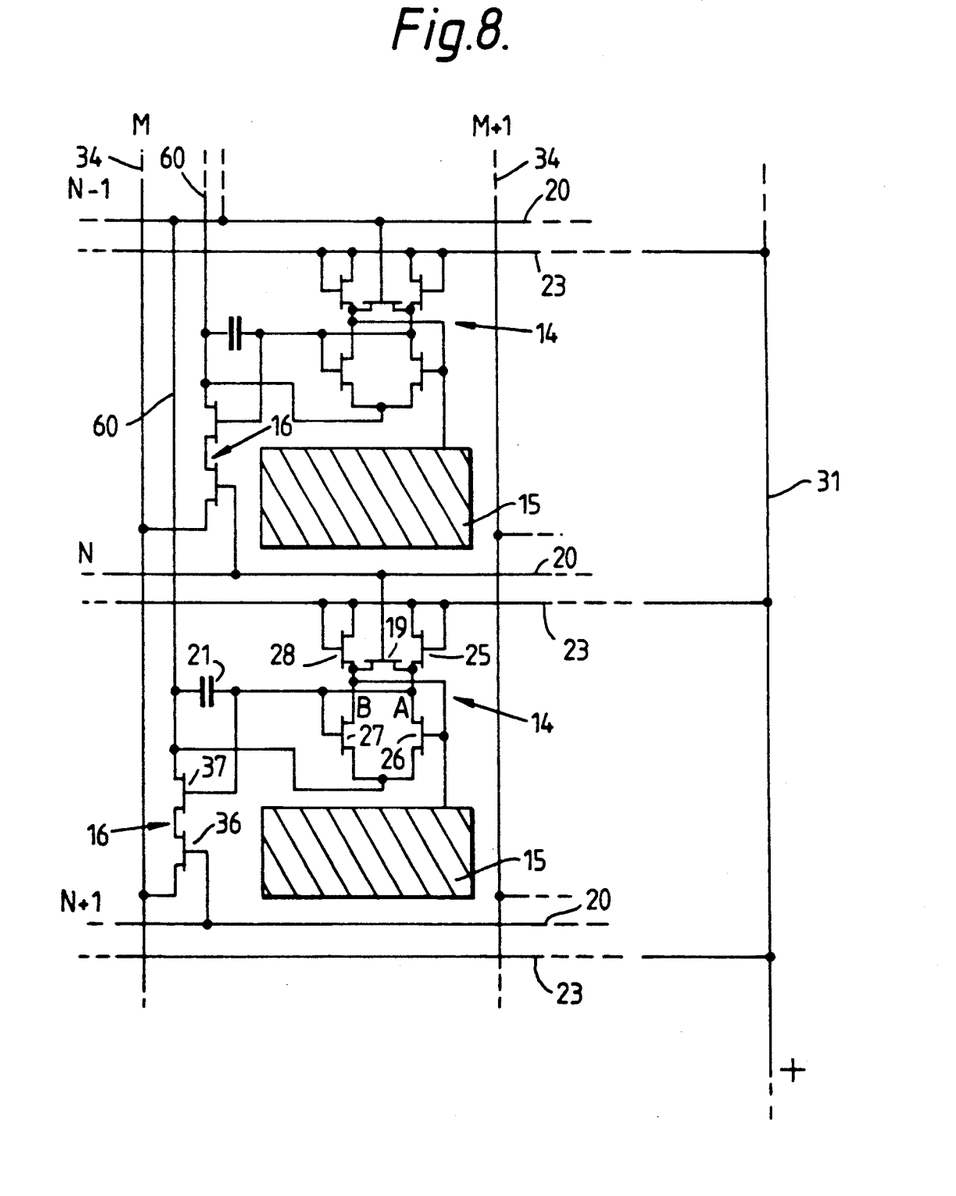
FIGS. 8 and 9 illustrate respectively the circuit of a part of an alternative embodiment of the sensor array device showing a typical sensing element together with its associated active matrix switching device, and typical waveforms appearing in operation of this embodiment.
Figure 9:
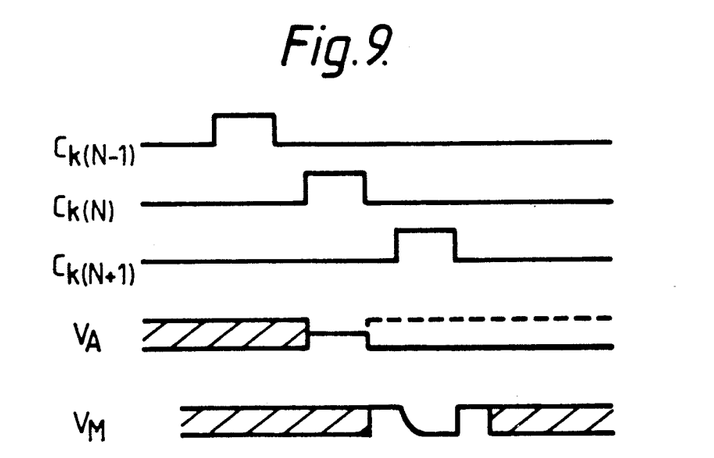

The circuit configuration of another embodiment of touch sensor panel is illustrated in part in FIG. 8, similar in respects to FIG. 5, and showing the circuit of a typical sensing element together with its associated driving and address conductors and active matrix switching transistors. In this embodiment, the need for a separate ground supply conductor to each row is avoided, use being made instead of the fact that the row conductors 20 are at ground potential except when a clocking pulse is actually being applied therealong. Typical waveforms present in operation of this embodiment are shown in FIG. 9 for comparison with those of FIG. 6.

In this circuit arrangement, a positive supply line 23 is again provided for each row of sensing elements. However the ground supply lines 24 previously described are not used and instead each row of sensing elements is associated with three clocking signal row conductors 20, rather than two as previously. Comparing FIG. 8 with FIG. 5, it will be seen that a main electrode of the transistor 37 of the active matrix transistors, the side of the reference capacitor 21 remote from the node A and the interconnection between the transistors 26 and 27 of the bistable circuit are all connected via a line 60 to the (N−1)th row conductor 20. Operation of the sensing element, and likewise all other sensing elements in the same row, is generally similar to that of the previous embodiment. A clocking signal pulse applied to the Nth row conductor 20 resets the bistable circuit and, upon termination of this pulse, the bistable circuit adopts one of other of its two possible stable states according to whether or not a touching input is made to the sensing electrode 15. The necessary grounding of circuit components is achieved through the line 60. FIG. 9 illustrates the clocking pulse sequence for the three consecutive, (N−1), N, and (N+1) row conductors 20 from which it will be seen that for the duration of the clocking pulses applied to the Nth and (N+1)th row conductors 20 the (N−1)th row conductor is held at ground potential. The state of the bistable circuit is read out, as previously, upon turning on of the active matrix transistor 36 by a clocking pulse applied to the (N+1)th row conductor 20. The elimination of the need to use ground supply conductors means that fewer sets of row conductors are required. However, it becomes necessary to provide an additional row conductor for the first row of sensing elements if these elements are to be fully operational.

With regard to both embodiments, fabrication of the array of sensing elements, the active matrix, and the address and driving conductors is based on technology used in active matrix addressed display devices, such as liquid crystal display devices. In active matrix display panels the picture elements each consist of a display element having first electrode carried on one substrate together with sets of row and column address conductors and with one or more associated matrix switching transistors. (A second display element electrode is carried on a second, spaced, substrate with electro-optical, for example liquid crystal material, therebetween.) It will be appreciated, therefore, that there are many similarities between the structure on the one substrate of these display panels and the above described touch sensing panels. Active matrix display device technology is now widely documented and well established as a means for producing large area active matrix arrays and as such it is considered unnecessary to describe here in detail methods by which the panel of the sensing array system of the invention can be fabricated. Typically, this involves the deposition and patterning of a number of superimposed layers on a substrate. The active addressing of the sensing elements also is accomplished in much the same fashion.

Although the sensing panel 10 is constructed in similar manner the processing is slightly more complex than standard display panels because of the necessity to incorporate additional sets of conductors and seven transistors for each sensing element.

As in active matrix display devices, a glass substrate is used with the transistors comprising thin film transistors (TFTs) using amorphous silicon or polycrystalline silicon technology. The address and driving conductors are formed by patterning metal layers, with appropriate insulation at cross-overs. The reference capacitors 21, and discrete supplementary capacitances Cs if required, are formed by defining metal pads from the deposited metal layers with insulative material therebetween. Similarly, the sensing electrode 15 is defined from a deposited opaque or transparent conductive layer, depending on how the system is to be used. The insulating layer covering the electrodes 15 is provided as a single layer extending over the whole area of the sensing element array to form a continuous sensing surface. The insulating layer serves also to provide a degree of electrical and mechanical protection for the sensing element array.

The physical dimensions of the sensing elements and particularly the sensing electrodes 15, may be varied to suit the particular requirements of the touch sensor array in use, for in accordance with the desired resolution characteristics. The sensing element dimensions may be of the same order as used for pixel elements in a display device, say around 100 micrometers square, or larger.

The above described embodiments of touch sensor systems may be used as a stand alone input interface. Alternatively they may be used as an overlay to a display device, for example a matrix liquid crystal display device or CRT. To this end, the sensing electrodes at least of the sensor elements should be transparent. The high resolution possible means that very precise position sensing can be achieved. When used as a display overlay, therefore, there can be a 1:1 relationship between the individual sensing elements and display pixels of the display device, for example an active matrix address liquid crystal display device. For a colour display one sensing element can be provided for each triplet of display elements. A typical liquid crystal display device comprises two spaced substrates carrying electrodes defining an array of pixels together with addressing conductors and with liquid crystal material therebetween. The sensing element array is mounted over the display device with each sensing element in registration with an individual display pixel.

It will be appreciated that various modifications to the described embodiments are possible. For example, the need for a dedicated reference capacitor 21 can be avoided by using instead parasitic capacitance of the TFT 37 as a reference capacitance. This parasitic capacitance can be increased by deliberately extending its gate contact over its source contact. Moreover, as will be understood by persons skilled in the art, alternative kinds of bistable circuit configurations, for example long tailed pair circuits, could be employed.

Although the described embodiments employ three-terminal transistor devices for the active addressing, it is envisaged that the sensing elements could be actively addressed by means of two-terminal non-linear switching devices, such as diodes or MIMs for example, following technology already known and used in active matrix addressing of display devices.

Also, it is envisaged that the sensing elements could be made to be responsive to touch inputs other than by the capacitive approach utilised in the specific embodiments described, for example by using a technique which relies on direct electrical contact between the position designating means and a component of the sensing element so that the state adopted by the bistable circuit of a sensing element is determined by the presence or absence of such electrical contact.

From reading the present disclosure, other modifications will be apparent to persons skilled in the art. Such modifications may involve other features which are already known in the field of touch sensor array systems and which may be used instead of or in addition to features already described herein.

I claim:

1. A touch sensor array system including an array of sensing elements arranged according to rows and columns, and addressing means comprising row and column conductors for selectively addressing a particular one of said sensing elements at an intersection of a selected row conductor and a selected column conductor, characterised in that:

each sensing element comprises an electronic bistable circuit at the sensing element's location in the array, said bistable circuit being responsive to a presence or absence of a touch input at the location of the sensing element so as to adopt a first or a second stable state, respectively, that remains continuously addressable, and which upon addressing by said addressing means provides an output in accordance with its actual state, said system further comprising reset means for periodically resetting said bistable circuits of said sensing elements.

2. A touch sensor array system according to claim 1, wherein said system further comprises an active matrix of switching devices and said addressing means includes a detection circuit for detecting the state of said bistable circuits, and wherein each said sensing element includes a respective switching device of said active matrix of switching devices and is actively addressable through operation of the respective said switching device by said addressing means to enable said detection circuit of said addressing means to detect the state of said bistable circuits.

3. A touch sensor array system according to claim 2, characterized in that said addressing means actively addresses said sensing elements at intervals related to the periodic resetting of said bistable circuits.

4. A touch sensor array system according to claim 3, characterized in that said switching devices are comprised of thin film transistors.

5. A touch sensor array system according to claim 4, characterized in that said sensing elements are reset by said addressing means a row at a time in sequence.

6. A touch sensor array system according to claim 5, characterized in that said switching devices of said sensing elements are operated by said addressing means a row at a time in sequence.

7. A touch sensor array system according to claim 6, further comprising row address conductors connected to each sensing element in a row of sensing elements, and column detector conductors connecting each sensing element in a column of sensing elements to said detection circuit, said sensing elements being reset and said switching devices being operated by selection signals supplied via said row address conductors.

8. A touch sensor array system according to claim 7, characterized in that said bistable circuit of each switching element is responsive to a capacitive effect produced by a position designating means in proximity to the sensing element.

9. A touch sensor array system according to claim 8, characterized in that each sensing element includes a sensing electrode which, in conjunction with the position designating means, provides a certain capacitance.

10. A touch sensor array system according to claim 9, characterized in that said bistable circuit of each sensing element comprises two bistable nodes and two cross-coupled inverters, said sensing electrode is connected to a respective one of said bistable nodes, a reference capacitance is connected to the other bistable node, said bistable circuit being periodically reset by said addressing means to a metastable state, following which resetting said bistable circuit adopts its first or second state depending on the relative values of said sensing electrode and said reference capacitance.

11. A touch sensor array system according to claim 10, characterized in that each said bistable circuit further includes a switching transistor connected across the inputs of said two inverters which is operable by said addressing means to set the bistable circuit to its metastable state.

12. A touch sensor array system according to claim 11, characterized in that a layer of insulating material is provided over the sensing electrode of each sensing element.

13. A touch sensor array system according to claim 12, characterized in that said layer of insulating material over each sensing element comprise respective portions of a common and continuous layer of material extending over said array of sensing elements.

14. A touch sensor array system according to claim 13, characterized in that said bistable circuits comprise thin film transistors.

15. A touch sensor array system according to claim 1, further comprising a display device having a display output area positioned in conjunction with said array of sensing elements so that said sensing elements are positioned over said display output.

16. A touch sensor array system according to claim 2, characterized in that said switching devices are comprised of thin film transistors.

17. A touch sensor array system according to claim 2, characterized in that said sensing elements are reset by said addressing means a row at a time in sequence.

18. A touch sensor array system according to claim 1, characterized in that said bistable circuit of each switching element is responsive to a capacitive effect produced by a position designating means in proximity to the sensing element.

19. A touch sensor array system according to claim 2, characterized in that said bistable circuit of each switching element is responsive to a capacitive effect produced by a position designating means in proximity to the sensing element.

20. A touch sensor array system according to claim 1, further comprising a display device having a display output area positioned in conjunction with said array of sensing elements so that said sensing elements are positioned over the display output.

* * * * *